(12) United States Patent
Revanur et al.

(10) Patent No.: US 12,344,538 B2
(45) Date of Patent: Jul. 1, 2025

(54) HIGH SALINITY WATER PURIFICATION PROCESSES AND SYSTEMS UTILIZING PERVAPORIZATION

(71) Applicants: Ravindra Revanur, Fremont, CA (US); Stephen M. Mosher, Chandler, AZ (US)

(72) Inventors: Ravindra Revanur, Fremont, CA (US); Stephen M. Mosher, Chandler, AZ (US)

(*) Notice: Subject to any disclaimer, the term of this patent is extended or adjusted under 35 U.S.C. 154(b) by 395 days.

(21) Appl. No.: 18/114,927

(22) Filed: Feb. 27, 2023

(65) Prior Publication Data

US 2023/0271855 A1 Aug. 31, 2023

Related U.S. Application Data

(63) Continuation-in-part of application No. 16/938,055, filed on Jul. 24, 2020, now Pat. No. 11,591,245.

(60) Provisional application No. 62/878,219, filed on Jul. 24, 2019.

(51) Int. Cl.
*C02F 1/44* (2023.01)
*C02F 103/08* (2006.01)

(52) U.S. Cl.
CPC .......... *C02F 1/448* (2013.01); *C02F 2103/08* (2013.01); *C02F 2305/00* (2013.01)

(58) Field of Classification Search
CPC ........ B01D 61/005; C02F 1/441; C02F 1/445; C02F 1/448
See application file for complete search history.

(56) References Cited

U.S. PATENT DOCUMENTS

| 4,944,882 A * | 7/1990 | Ray | B01D 61/3621 210/640 |
|---|---|---|---|
| 11,541,352 B2 * | 1/2023 | Benton | B01D 61/0022 |
| 2020/0024557 A1 * | 1/2020 | Benton | B01D 61/0022 |

* cited by examiner

*Primary Examiner* — Bradley R Spies
(74) *Attorney, Agent, or Firm* — Larry K. Roberts

(57) ABSTRACT

A high salinity water purification system and process, including a forward osmosis system and a reverse osmosis or nanofiltration system. A solids membrane separation system removes solids from the influent water being processed. A pervaporation (PV) system eliminates liquid impurities from the influent water being processed.

20 Claims, 5 Drawing Sheets

HIGH SALINITY WATER PURIFICATION PROCESSES AND SYSTEMS UTILIZING PERVAPORIZATION

CROSS-REFERENCE TO RELATED APPLICATION

This application is a continuation-in-part application of U.S. Non-Provisional patent application Ser. No. 16/938,055, filed Jul. 24, 2020, which in turn claims priority to U.S. Provisional Application No. 62/878,219 filed Jul. 24, 2019, the entire contents of which are hereby incorporated by reference.

BACKGROUND

One of the greatest challenges in water treatment is addressing high levels of total dissolved solids (TDS) in water—basically: how to desalinate high TDS solutions. An emerging treatment technology is a process called "forward osmosis" (FO). This process differs from traditional reverse osmosis (RO). A traditional RO system pushes water at high pressure through a membrane that essentially filters out dissolved minerals and produces a clean water stream and a concentrated salt water stream. An FO system draws water across the membrane to purify it at a low pressure which reduces membrane fouling potential. With an RO, the higher the total dissolved solids of the water, the higher the pumping pressure required and subsequently higher capital and operating cost. The higher the overall total dissolved solids, the more complex and expensive is the technical solution.

One example of high TDS water is produced water, which is the water that comes from deep within the ground during the production of oil. As oil is brought out of the ground, water comes with it, which is thus called "produced water". This water is very difficult to treat as it not only has high levels of suspended solids and organics which can blind filter media and membranes, the water is also extremely high in dissolved mineral salt content. Typically, the produced water is either hauled off site to a disposal well or directly injected back into the ground for disposal. Hauling the water is very costly and recent research indicates that injecting produced water back into injection wells can cause formation damage underground. For that reason, injection wells are being reduced as a possible solution for waste disposal. The best solution is to minimize the amount of water put back into the ground and utilize any good water for other industrial uses. Yet treating this water is extremely difficult.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
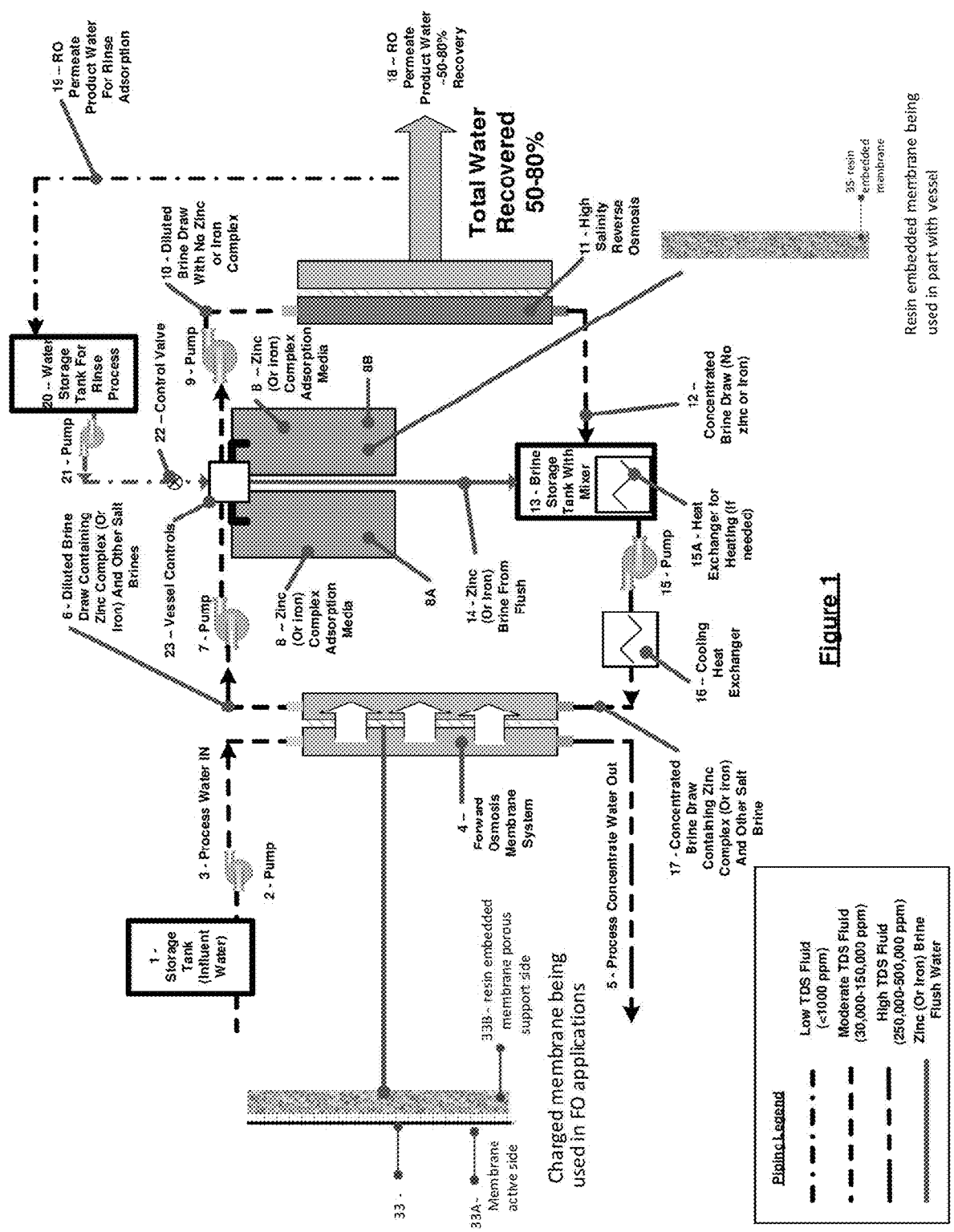
FIG. 1 is a schematic diagram illustrating an exemplary embodiment of a high salinity water purification system and process.

In the following detailed description and in the several figures of the drawing, like elements are identified with like reference numerals. The figures are not to scale, and relative feature sizes may be exaggerated for illustrative purposes.

Water naturally wants to be in a state of equilibrium with respect to mineral content. An FO system utilizes a high TDS brine stream with stronger osmotic attraction than a waste stream to pull or draw pure water from the waste stream across a semipermeable membrane into the high TDS brine which thus dilutes it. The osmosis process will naturally continue until the osmotic attraction of the two streams are approximately equivalent. The water that is pulled across the membrane and essentially dilutes the brine solution is then extracted from the brine in various traditional treatment technologies, most commonly reverse osmosis (RO) or nanofiltration. The pure water is produced in one stream from the RO and the other stream re-concentrates the brine solution which then becomes the feed water back to the FO membrane. The process is then repeated in a continual process.

The benefit of the FO system is the natural osmotic driving pressure is much lower than the pressure on a traditional RO membrane which minimizes the fouling potential and subsequently reduces operating and maintenance cost of the FO membrane system. A significant challenge with implementing a forward osmosis system is how to efficiently process and re-concentrate extremely high TDS brines. This application describes low cost, high efficiency methods of accomplishing high TDS brine draw re-concentration.

As noted above, the forward osmosis solution is highly advantageous because instead of pushing water across a membrane at high pressure which damages separation membranes (often beyond repair), FO "pulls or draws" pure water across the membrane at low pressure through natural osmosis and a brine solution which allows for easier and more effective membrane cleaning. This minimizes membrane fouling, whereas at high pressure RO membranes become fouled beyond repair. In the FO continual process, the pure water is produced and the concentrate stream from the RO system re-concentrates up the brine to continue pulling pure water across the FO membrane. However, in this FO brine recycling process, there are limitations as to how high a reverse osmosis system can re-concentrate the reject brine stream which limits how much water and what TDS of water an FO system can process. This new process technology advancement works in combination with the reverse osmosis system, or alternatively a nanofiltration system, to concentrate up the brine levels to even higher levels than ever possible (excluding use of high energy, high cost evaporators) which will help achieve greater water savings at a lower operating and capital cost. As is well known in the art, nanofiltration uses a different membrane than RO, with a different pore size to filter differently.

First Embodiment

A two-step water purification system and process are illustrated in FIG. 1. This embodiment employs a strong anionic base adsorption media such as a resin and/or resin embedded membrane to recycle a zinc or iron-based brine draw combined with a sodium or magnesium-based brine draw (or acid) before a high salinity reverse osmosis or nanofiltration system for improved brine draw recycling performance and overall higher efficiency. Zinc or iron-based brines are unique in that they naturally have an extremely high osmotic attraction which makes it beneficial as an FO brine draw. Zinc combined with a salt such as chloride can become "complexed" thus giving it a natural selective attraction/affinity to the adsorption media used in the purification process. This happens when the zinc or iron is in combination with a brine (sodium chloride as an example) or in combination with an acid such as hydrochloric acid. Either of these two conditions makes the zinc into the form that the adsorption media will adsorb it, as described more fully below. The brine is in sufficient concentration levels to complex the zinc or iron-based compound.

Zinc or iron-based brines are also unique in that there are anionic adsorption media with specific chemical affinity for zinc or iron-based brines. What makes this process even more unique is that the adsorption media rinse "elutant" for these specific adsorption media, e.g. a resin and/or resign embedded membrane, is plain water as opposed to another brine, acid, or base chemical. This makes rinse/flush cost of the adsorption media solution extremely inexpensive and low energy.

In the following description of the first embodiment, zinc-based brines are specifically described. it will be understood that iron-based brines also provide similar properties and may alternatively be used in the process.

The first step in processing the brine from the FO system is to separate the zinc-based brine from a sodium or magnesium-based brine, or acid (combined with pure water) using the adsorption media. The second step is to process the sodium or magnesium-based brine (or acid) by purifying it with a standard high salinity RO or nanofiltration system, thus producing clean water and a re-concentrated brine. This re-concentrated brine is then blended with the eluted zinc-based brine from the adsorption media rinse process. The combined brine solution is then fed back to the FO membrane and is used in a continual process.

The first step is done in a manner that uses a low-energy strong base anion exchange media (resin or membrane) and fresh water for the flush. Utilizing fresh water for rinse is a key factor because it is extremely low cost. There are many resins and membranes that can separate zinc from resin (and resin embedded membranes), but the more zinc to be removed, the more flushing chemical needed which drives up operating cost significantly. The process of this embodiment by which the unique anionic media removes zinc involves the zinc-based brine being combined with another brine (or acid, such as HCl). This combined brine is in a multivalent form as opposed to a normal cationic phase, thus allowing the anionic adsorption media to have a strong natural attraction to it. This strong attraction binds or adheres the zinc multivalent anionic complexes to the anionic media. When the brine is removed from the media and the media goes into the rinse or backwash cycle with fresh water and/or alkaline water, the accompanying brine is flushed from the adsorption media which reverses the multivalency of the zinc-based brine, and thus the zinc-based brine is easily removed from the resin with just low total dissolved solids water. For this reason, the FO brine draw includes a blend of multiple brine solutions or the zinc-based brine is in combination with an acid (such as HCl).

This process utilizes a combined blend of brines or acid, to include zinc chloride, zinc bromide, ferric chloride, sodium chloride, sodium bromide, and or magnesium chloride as primary examples (also to include: LiCl, CaCl2, LiCl) and HCl, HCl, KCl, CsCl, NH4Cl, and HONH3Cl). The elements from Ni2+, Fe2+, Co2+, Mn2+, Fe3+, Cu2+, Sn4+, In3+, Zn2+, Cd3+, Pb3 under certain specific environments form halo-metal complexes that can be separated from these resin and/or resin embedded membranes.

The acid can be in solution with the zinc brine, but that is not necessary. Zinc chloride will attach to the adsorption media in the presence of an acid (such as HCl) or in the presence of another brine (such as NaCl). The acid would be in the brine or in place of the salt-based brine and consistent throughout the FO system. To recover the costly brine draw material and minimize waste, strong base anion adsorption media is used to first separate the zinc bromide or zinc chloride brine salts thus leaving the effluent solution as only pure water combined with the magnesium chloride, sodium bromide, or sodium chloride brine draw to be processed by the high salinity RO or nanofiltration system. The strong base anion adsorption media is flushed with clean, permeate water in a final step of the process.

Referring now to the schematic of FIG. 1, a storage tank 1 holds the influent water for the process, which is a moderate TDS fluid, in the range of 30,000 to 150,000 ppm. The process water 3 is pumped by pump 2 to provide a brine stream on the input side of FO membrane system 4. The output side of the FO membrane 33 has a concentrated brine draw containing Zinc complex (or iron) and other salt brine. The concentrated brine draw is a high TDS fluid, in the range of 250,000 to 500.00 ppm. The high brine draw fluid draws pure water across the FO membrane, leaving a diluted brine draw, which did not pass through the FO membrane, containing the Zinc complex (or iron) and other salt brine. With pure water having been drawn out by the FO system, the process water leaving the FO system is a concentrated fluid, with a TDS in the range of 300,000 to 500,000 ppm. The concentrated process fluid 5 is waste from the process, to be hauled off-site or otherwise disposed of. In accordance with an aspect of an embodiment of the invention, the membrane 33 is a "charged" membrane, with a membrane active side 33A located on the input side of the FO system 4, and a resin-embedded membrane porous support side 33B on the FO output side. Charged membranes are discussed more fully below with respect to FIGS. 3 and 4.

The diluted brine draw 6 from the FO process is pumped by pump 7 through vessel controls 23, including a valve system, to media vessels 8A, 8B holding a Zinc or iron complex adsorption media, e.g. a strong anionic base resin or membrane which has an extremely high osmotic attraction to the zinc or iron based complexes in the diluted brine draw. The zinc or iron complex adheres to the adsorption media, separating the zinc bromide or zinc chloride so that the output 10 pumped from the vessels 8A, 8B by pump 9 is essentially free of the zinc or iron complex. This diluted brine draw 10 has NaCl, NaBr or MgCl2 (or acid) and is a moderate TDS fluid, on the order of 30,000 to 150,000 ppm.

One example of the adsorption media suitable for the purpose is Strong Base Anion, Gel Type 1, Quaternary Amine Functional Group, Styrene Crosslinked with Divinylbenzene, Chloride Form. In accordance with a further aspect, the vessels 8A, 8B may include a resin-embedded membrane 35. Any polymer, modified polymers or polymer solutions that can be transformed into a membrane form can be used to prepare resin embedded membranes. Examples of well-known polymers being used to make membranes are polyamides, polysulfones, polyvinylidene fluoride and polypropylene. The resin-embedded membrane 35 may be used in combination with the adsorption media 8, or may replace the adsorption media. Resin-embedded membranes are described more fully below in connection with FIG. 3.

Zinc chloride when combined in solution with sodium (or magnesium) chloride brine will form a divalent anionic complex of [ZnCl4]2—which has a direct chemical "selective" affinity for strong base anion resin and membrane media. In this form, the Zinc complex will be adsorbed onto the media (resin or membrane) but allow other cations to pass and not be adsorbed on the media. The media is maintained in the chloride form, but with such high levels of chloride present in the subsequent brine (sodium or magnesium chloride brine), the chloride is not affected or exchanged. Just the zinc chloride complex is adsorbed to the resin or membrane media. The adsorption media, such as the resin, has selective attraction to various ions such as chloride, hydroxide, and hydrogen. When the resin goes through an ion exchange process, one ion is exchanged (ion to be removed) for the "ion form" (ion naturally on the resin). In this case, if there was "ion exchange", chloride would be released into the water as the zinc was adsorbed. But since the brine has such a high concentration of chloride in the brine, e.g., at least 30,000 ppm, there is no release of the chloride. In this case, there is not technically "ion exchange;" there is no actual exchange of ions, just adsorption.

During the rinse or "flush" step of the resin to remove the zinc chloride complex from the resin or membrane, the sodium or magnesium chloride brine is flushed from the media tank, then RO permeate water fills the tank. This removal of the brine and replacement with low TDS water neutralizes the valency of the complex which reverses the adsorption process, thus zinc chloride complex sloughs off the resin and dissolves into the RO water. In the flush process, a minimal amount of RO water or alkaline water is utilized to maximize zinc chloride concentration in the solution to re-form a brine. This flushed product is then blended back with rejection brine from the high salinity RO system (sodium or magnesium chloride brine) which forms a blended high brine solution (zinc chloride and sodium or magnesium chloride). This then reestablishes the zinc chloride complex and thus the purification process can be repeated. The zinc chloride has a natural strong osmotic "draw" which makes it beneficial as a brine draw in the forward osmosis process. An important feature is the use of fresh water to neutralize the zinc chloride complex in a continual process with no required special rinse chemicals, significantly reducing the material costs in the process.

The diluted brine draw 10 is pumped from vessels 8A, 8B into a high salinity RO membrane system 11, with the fluid passed through the membrane constituting RO permeate water, essentially or relatively pure water. The relative percentage of RO permeate water recovered from the process water 3 is typically on the order of 50% to 80%.

The brine draw 12 from the RO system which did not pass through the RO membrane is a concentrated brine draw, a high TDS fluid with TDS 250,000 ppm. The brine draw 12 does not have zinc or iron), which had been removed by the adsorption media 8 in vessels 8A, 8B. The concentrated brine draw 12 is stored in brine storage tank 13, for mixing with zinc (or iron) flushed from the adsorption media during a rinse cycle. The storage tank may include a mixer and optional heat exchanger 14.

In this embodiment, a part 19 of the RO permeate water is used for rinse adsorption in a rinse cycle for the adsorption media 8 in vessels 8A, 8B. The RO permeate water used for this purpose is stored in tank 20 for use during the rinse cycle.

During the rinse cycle, the vessel 8A or 8B is isolated from the pumps 7 and 9 by valves of the vessel controls 23. The sodium or magnesium-based brine (or acid) is drained from the isolated vessel, either to the brine storage tank 13 or pumped to the RO. Permeate product water 19 stored in tank 20 (or fresh water from another source) is released into and fills the isolated vessel through control valve 22, reversing the multivalent condition of the zinc (or iron) complex previously adsorbed onto the media in the isolated vessel. The media releases the zinc (or iron) brine which is dissolved back into the permeate water (or fresh or tap water). During the rinse cycle, the water released into the vessel 8A may be allowed to rest in contact with the media. An optional step is to recirculate the permeate water over the media to minimize water used in the process and increase zinc (or iron) concentration in solution. After the cycle is complete, with the zinc in solution in the water, the resulting brine is released from the isolated vessel by operation of vessel controls 23 (essentially a three-way valve) into tank 13 for mixing with the concentrated brine draw 12. Now, to revert to the purification mode for the system, valve 22 is closed, and vessel controls 23 reconnect the pump 7 to the input of the isolated vessel and to pump 9, and pumps 2, 7, 9 and 15 are activated. The resulting brine 17 from tank 13 is a concentrated brine draw containing a Zinc or iron complex and other salts.

The zinc-based (or iron) removal media vessels 8A and 8B are designed to be in a "dual", "twin", or "multiple train" mode where one vessel is online and operational while the other vessel (s) is/are regenerated then put back into a "standby" ready-for-use condition. There is a continuous flow of zinc-based (or iron) concentrate waste from the rinse process; thus the brine draw is optimally recycled.

The tank 13 may include a heat exchanger 14 for heating the brine if necessary, and a cooling heat exchanger 16 may be located downstream of the heat exchanger. The purpose of the cooling heat exchanger is to cool down the brine draw prior to entering the forward osmosis membrane to minimize mineral fouling on the forward osmosis membrane. This brine draw loop is a continuous processing loop with multiple pumps. The pumps build up heat over time, so a cooling step controls fluid temperature which in turn minimizes the potential for mineral scale fouling on the FO membrane.

To recover clean water from high brine or highly saline water streams such as sea water, manufacturing waste streams, produced water or fracturing flow back water, the high brine recovery or rinse system may be implemented as noted above. The treatment technology described above splits out the pure water thus making it available for reuse and at the same time re-concentrate up the brine draw so the system works in a continuous low cost, high efficiency process. This is done in a manner that uses a low energy strong base anion adsorption media, such as a resin, and fresh water for resin rinse. Utilizing fresh water for rinsing is an important factor because it is extremely low cost.

There are many resins that can separate zinc from resin, but the more zinc to be removed, the more regeneration chemical is needed, which drives up operating cost significantly. Traditional cationic resins used for zinc removal would utilize so much rinse chemical that the process would be cost prohibitive. In the process described above regarding FIG. 1, the unique anionic resin removes zinc from the zinc-based brine which is combined with another brine (or acid, like HCl); in this state the brine is multivalent thus allowing the anionic resin to have an attraction to it. When the resin goes into the rinse cycle with fresh water, this flushes the accompanying brine from the resin which reverses the multi-valency of the brine and thus the zinc-based brine is easily removed from the resin with just tap water. For this reason, it is important that the FO brine draw include or consist of a blend of multiple brine solutions blended together or be in combination with an acid (such as HCl). These include zinc chloride, zinc bromide, sodium chloride, and or magnesium chloride as examples (but not limited to). To recover the costly brine draw material and minimize waste, a strong base anion exchange resin is used to first separate the zinc bromide or zinc chloride brine salts thus leaving the effluent solution as only pure water combined with the magnesium chloride, sodium bromide, or sodium chloride brine draw to be processed by the high salinity reverse osmosis system. The strong base anion resin is regenerated with clean, permeate water from the final step of the process. The high salinity reverse osmosis (or nanofiltration) system is then used as the final processing step to produce permeate water for reuse at the same time producing a high total dissolved solids brine to be blended with the regenerant from the resin stage in the process.

Overall system recovery rate can be as high as 50-80% depending on the influent water quality and salt content, while net operating pressures are minimal due to low fouling factors and thus optimal energy efficiency (no evaporation process required).

This process has the potential to treat incoming water streams that are over 300,000 ppm TDS and extract pure water from the stream without using evaporative processes. This has yet to be achieved using any other technology outside of high energy cost, high operating cost, and high capital cost evaporator technologies.

Exemplary applications for the system and process include sea water desalination, mining wastewater treatment, produced water and frac flow back treatment, industrial waste water recycling, food processing waste water recycling, brine concentration "weight up" processes, juice concentration food processing, and power plant effluent treatment.

Following is an equipment list for the system illustrated in FIG. 1:

Equipment Item List: 1) Influent Storage water tank for primary feed water to the system; 2) Feed water pump; 3) Process water fed into FO membrane system; 4) Forward Osmosis membrane system; 5) Effluent Waste Rejection from the FO system; 6) Diluted Brine Draw containing Zinc Complex (or iron) and other brine salts (example sodium chloride, magnesium chloride); 7) Media pump to Anionic media 8) Adsorption media (resin or membrane) for Zinc complex; 8A, 8B) Vessels for holding the adsorption media; 9) RO Feed pump; 10) Diluted Brine Draw with No Zinc or Iron Complex; 11) High Salinity Reverse Osmosis system; 12) Concentrated Brine Draw with sodium or magnesium chloride only (no zinc complex 13) Brine Storage and Mix tank; 13A Heat exchanger for heating if necessary; 14) Zinc (or Iron) Chloride Brine from Brine Flush; 15) Forward Osmosis pump; 16) Cooling Heat Exchanger; 17) Concentrated Brine draw containing both Zinc (or iron) chloride and sodium (or magnesium) chloride; 18) RO Permeate Water; 19) RO Permeate Product Water for Adsorption Rinse; 20) Water Storage tank for RO permeate and Resin Flush; 21) Pump for Resin Rinse process to neutralize zinc chloride complex; 22) Control Valve; 23) Media Vessel Controls.

Second Embodiment

Figure 2:
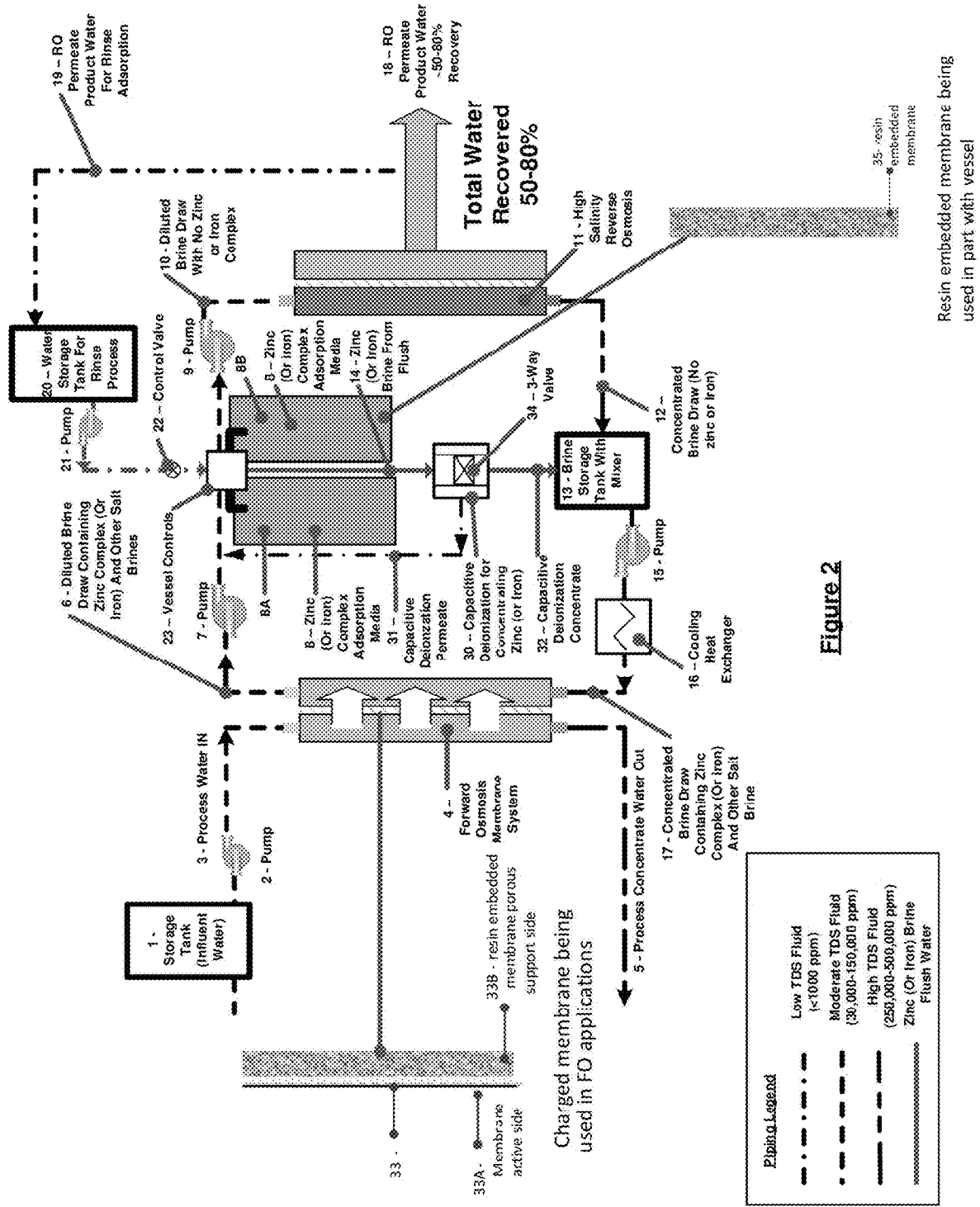
FIG. 2 is a schematic diagram illustrating a second exemplary embodiment of a high salinity water purification system and process.

FIG. 2 is a schematic diagram illustrating a second embodiment of a high salinity water purification system. This system employs a three-step brine draw recycling process. The process uses the combination of a strong anionic base adsorption ion resin or strong base anion adsorption membrane, sometimes referred to as "media," in addition to a capacitive deionization system to recycle a zinc-based (or iron) brine draw combined with a sodium or magnesium-based brine draw (or acid) (which may include LiCl, CaCl2), LiCl and HCl, HCl, KCl, CsCl, NH 4Cl, and HONH 3Cl) and other halo-metal complexes. The brine draw is processed by a high salinity reverse osmosis system for improved brine draw recycling performance, overall higher efficiency, and lower operational cost.

The system and process of FIG. 2 differs from that of FIG. 1 in the rinse process. The purification cycle for the process of FIG. 2 is identical to that of the process of FIG. 1. The process of FIG. 2 utilizes an alternative adsorption media rinse.

The purpose of the capacitive deionization system is to further remove pure water and thus concentrate up the flushed zinc salts removed from the flushing/rinsing process. This process is used in lieu of an evaporator or heat exchanger to evaporate pure water off. Capacitive deionization is a more energy efficient method of removing pure water when compared to evaporator technologies.

The capacitive deionization system 30 (FIG. 2) works as follows. An aqueous stream containing dissolved solids (salt) is passed between two oppositely charged super capacitors (electric double layer capacitors, or EDLC). As the liquid passes through the dielectric spacer separating the capacitors, ions are attracted to the oppositely charged capacitor layers. The ions leave the water within the dielectric layer, pass through a charge specific membrane coating, and are adsorbed onto the surface area of the carbon super capacitor. When the capacitors have filled with ions, the polarity is reversed, and the ions are discharged back into the dielectric spacer and removed from the system. A 3-way valve is situated at the outlet of the device which directs the brine 32 away from the cleaned water 31.

Equipment Item List (items added to equipment of the embodiment of FIG. 1): 30) Capacitive Deionization System; 31) Capacitive Deionization Permeate; 32) Capacitive Deionization Concentrate Waste Containing Zinc chloride concentrate; 30A) 3-Way Valve.

The first step in processing the brine in a rinse cycle is to separate the zinc-based brine from a sodium, magnesium-based brine, or acid (combined with pure water). After flushing with fresh, low TDS water (first step), the eluted brine is concentrated (second step) with the capacitive deionization system 30. The sodium or magnesium-based brine (or acid) is purified with a standard high salinity RO system, thus producing clean water and a re-concentrated brine. This re-concentrated brine is then blended with the eluted zinc-based brine from the media rinse and capacitive deionization processes. The combined brine solution is then fed back to the FO membrane and is used in a continual process.

The first step is done in a manner that uses a low-energy strong base anion exchange media (resin and/or resin embedded membrane) and fresh water for the flush. This flushed brine from the offline media vessel 8A or 8B is then concentrated with the capacitive deionization (CD) system 30 to get maximum concentration from the zinc-based (or iron) brine. The CD permeate 31 is fed back to the vessel controls 23 for recycling. The CD concentrate is passed into the brine storage tank 13.

The high salinity reverse osmosis (or nanofiltration) system is then used as the final processing step to produce permeate water for reuse at the same time producing a high total dissolved solids brine to be blended with the capacitive deionization concentrate from the first media stage in the process. Overall system recovery rate can be as high as 50-80% depending on the influent water quality and salt content, while net operating pressures are minimal due to low fouling factors and thus optimal energy efficiency (no evaporation process required).

Figure 3:
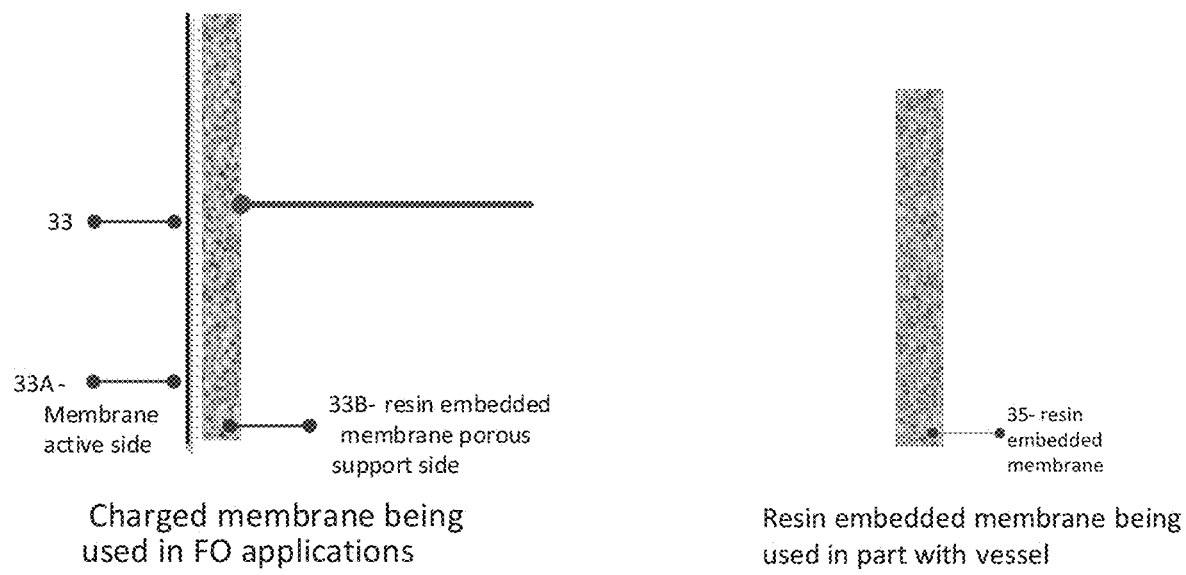
FIG. 3 illustrates an exemplary embodiment of a resin embedded membrane system.

Charged and Resin-Embedded Membranes:

A resin embedded membrane is illustrated in FIG. 3. The resin embedded membrane 35, which may be fabricated as spiral wound, hollow fiber, or plate and modules, can be used as an adsorption media (in to the vessel, item 8A or 8B in FIG. 1 and FIG. 2) or can also be used as the FO membrane.

Resin embedded FO membranes 33, also referred to as "charged" membranes, can be of thin film composite, asymmetric, or hollow fiber morphologies. Active resin, before casting the membrane, is dispersed in polymer solution. "Active" resin is resin that is not loaded with trapped ions, and thus sometimes does not need to be regenerated. Resin loading varies with thickness and application of membrane. In general, higher resin loading (example >50 wt % resin) imparts brittleness of the membrane. In real FO applications, the membrane porous support side 33B (with active resin) always needs to be exposed to the draw side. A membrane with an active resin layer is sometimes referred to herein as a "charged membrane," and can be used in FO, NF, RO and ED applications.

In the following description, zinc-based draw solutions are specifically described. Zinc-based (or iron) solutes when combined with sodium or magnesium-based draw (or acid) will form a divalent anionic complex of [ZnCl4]2—, which has a direct chemical selective affinity for strong base anion resin present in the charged membrane 33 used in the FO 4. The adsorbed complex ion serves as an osmolyte to pull more water from the feed side resulting in higher flux values from the FO membrane.

An added advantage with the charged membrane is that it does not require a rinse or flush step to destabilize and then remove zinc chloride with water. The fresh water continuously pulled by the FO membrane from the feed or process water 3 to the draw side naturally flushes/rinses the ion complex from the FO membrane. At the same time those are replaced with a new pool of ion-complexes from the draw solution 17. In this way the membrane always remains active or in a charged state that affects the overall flux through the membrane.

Figure 4:
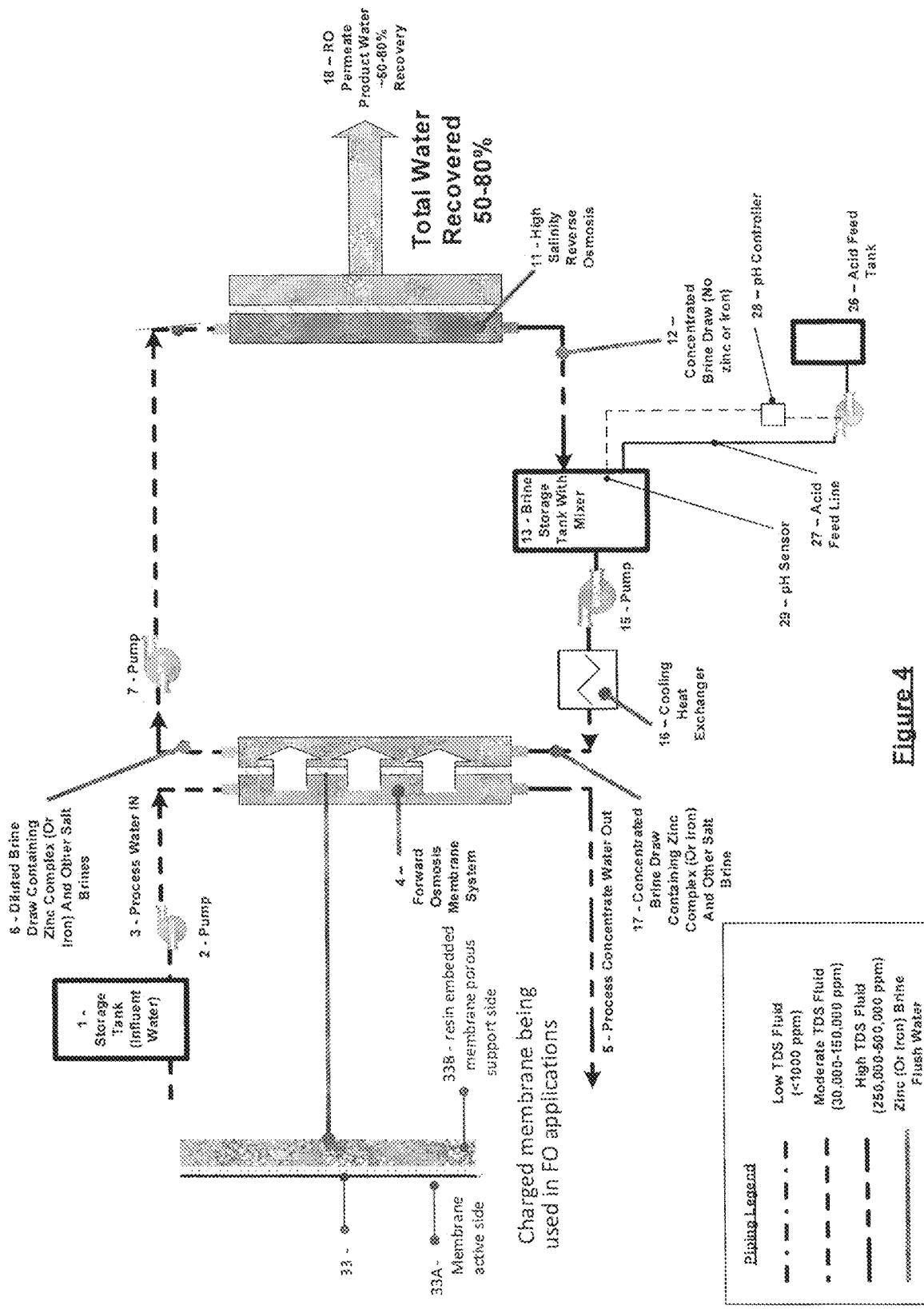
FIG. 4 is a schematic diagram illustrating a further exemplary embodiment of a high salinity water purification system and process.

FIG. 4 illustrates an exemplary embodiment of a system in which the rinse or flush elements are omitted, with the FO using a charged membrane as discussed above. The system of FIG. 4 is similar to that of FIG. 1, except that the vessels 8A, 8B, pump 9, the tank 20, pump 21 and control valve 22 are omitted. An acid feed tank 26 with pump, a pH controller 28 and pH sensor 29 are added to selectively add acid to the brine storage tank 13. The purpose of the pH control in this exemplary embodiment is as follows. Zinc chloride converts from the usual state of being cationic to anionic in two ways: mixing in a brine solution where the total dissolved solids are over 75,000 ppm or in an acidic condition where the pH is below approximately 3.0 pH. Both of these conditions convert the zinc chloride to an anionic form which will allow it to absorb onto the surface of either the resin or anionic membrane. As such, there is a supplemental pH sensor 29, acid feed line 27, pH controller 28, and acid feed tank 26 to feed supplemental acid feed in the event that the pH becomes too high. Thus, the acid feed system is designed to ensure the pH is correct in order for the zinc chloride to operate in anionic form.

Heavy metals such as Au, Pb, Cd, Fe, Ni, Cu, when exposed to specific environment example acidic conditions, form anion complexes. These valuable/toxic compounds can be successfully trapped and extracted by charged membranes, in the process concentrate water out 5. In a similar way, cyanide makes stable anionic complexes with heavy metals, and those ferrocyanides are removed from wastewater with charged membranes. Similarly, the charged membranes can be used in extraction of Nitrate salts from agricultural water, and boron, and mercury removal from brine liquids.

Charged membranes can be used as a standalone membrane in the FO process or in combination with resin or resin embedded membranes in the vessels 8A, 8B.

It is relatively easier to prepare resin-embedded membranes, being used in the resin vessels 8A, 8B. The resin-embedded membranes can be used in place of or in addition to the adsorption media in the vessels 8A, 8B. Resin embedded membranes cannot be used as a charged membrane. However, the charged membranes can, depending on specific application, be used interchangeably with resin-embedded membranes.

To enhance the propensity of draw and depending on the availability of room in the draw chamber of the FO unit, a sack of active resin can be placed in the draw chamber.

Resin-embedded membranes are used in place of adsorption media 8 or along with adsorption media 8. The media rinse system includes flushing with water, flushing with alkaline water etc. Flushing can be done at various temperatures, flow rates.

| 1. Differences between Charged Membrane and Resin embedded membrane | |
|---|---|
| Charged Membrane | Resin embedded membrane |
| Charged membranes contain active or barrier layer. Generally produced by Phase inversion process (membranes prepared by this method are called asymmetric membranes) or phase inversion followed by interfacial polymerization method (membranes prepared by this method are called thin film composite membranes, TFC membranes) | Resin embedded membranes generally prepared by phase inversion process with or without an active layer |
| Relatively thinner membranes. Thickness of membrane varies 50-250 micron. | No restriction on membrane thickness |
| These membranes are used in various membrane separation processes such as FO, RO, NF etc | These membranes only being used in resin vessel |
| Charged membranes contain active resin embedded in porous support layers. | These membranes contain active resin throughout across the membranes |
| In general contain lesser amounts of active resin | No restrictions on active resin loading |
| These membranes can be used in separation applications (FO, RO, NF etc.) and in vessels | These membranes have restricted application (in this case only in the vessel) |
| Quality of active layer plays a more important role than quantity of resin. | Quantity of resin (loading) plays an important role |

Barrier/Active Layer

Charged membranes contain an active or barrier layer. Generally produced by a Phase inversion process (membranes prepared by this method are called asymmetric membranes) or phase inversion followed by interfacial polymerization method (membranes prepared by this method are called thin film composite membranes, TFC membranes).

Preparation of asymmetric membranes is a single step process. However, TFC membranes needs a two-step preparation.

The quality (thickness, uniformity, cross link density etc.) of the active layer predominately decides the overall salt rejection and water flux through the membrane.

The thickness of the barrier/active layer in TFC membranes varies between 50-200 nanometers whereas it will be about a few microns in asymmetric membranes.

Pervaporation.

Figure 5:
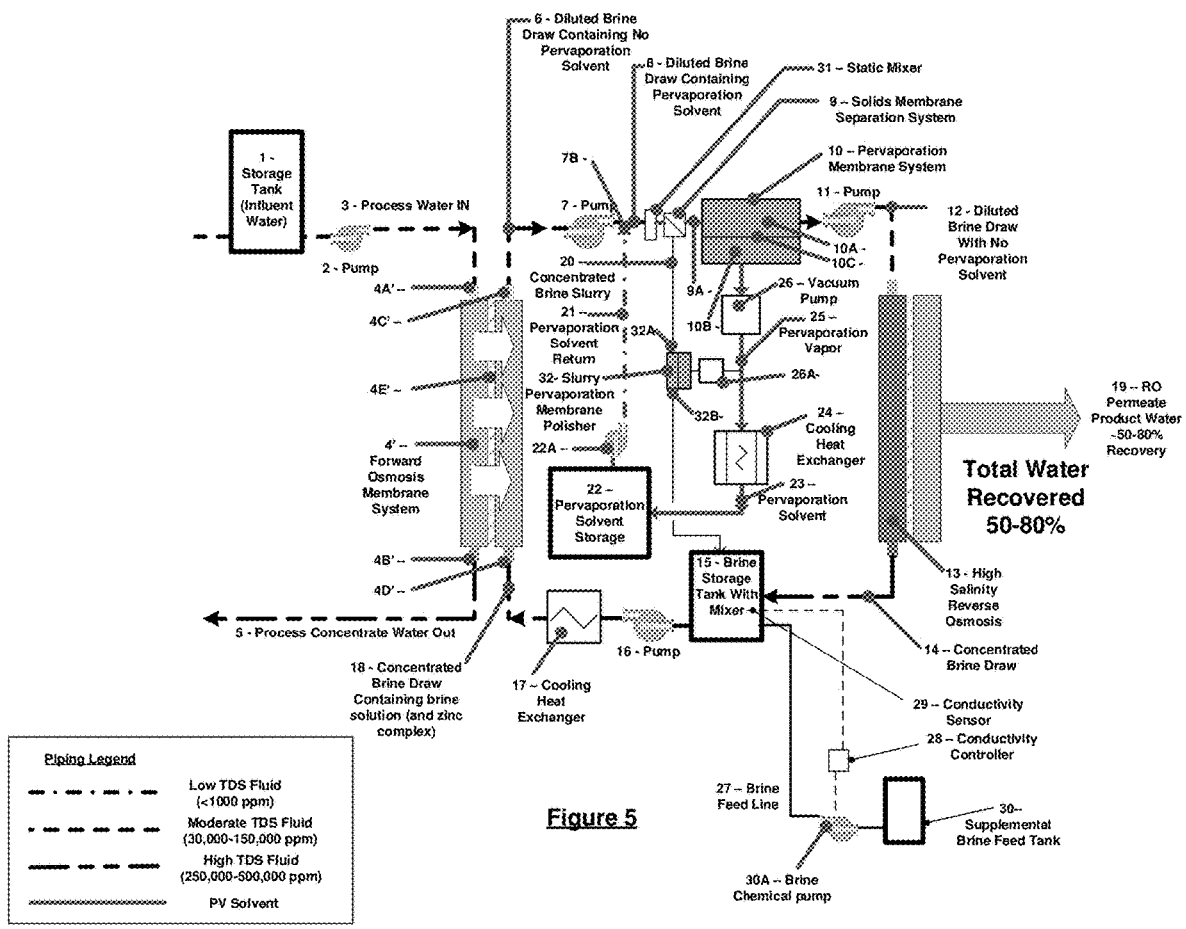
FIG. 5 is a schematic diagram illustrating a further exemplary embodiment of a high salinity water purification system and process, employing a pervaporation membrane system.

Pervaporation (PV) is a membrane separation process mainly used to separate azeotropic liquid mixtures and heat-sensitive liquid mixtures. Referring to FIG. 5, if the influent water 1 and/or brine water 15 includes liquid impurities such as methanol, ethanol, or other polar or nonpolar liquid species, neither the FO membrane 4 nor the RO membrane 13 alone can separate them. In the absence of further treatment (described below), these impurities would otherwise remain in the final produced water 19, and a separate distillation process would need to be employed. To avoid a separate distillation step and separate these impurities, a PV step is incorporated in the system disclosed in FIG. 5.

In this exemplary embodiment, the influent water from tank 1 is pumped by pump 2 as process water IN to a forward osmosis membrane system 4'. The system 4' may include a charged membrane as discussed regarding the system of FIG. 1, or it be a FO membrane system as described, for example, in US 2021/0024395 A1, or other FO membrane system. In the PV step according to an aspect of the invention, the separation takes place when a selective liquid permeates through a membrane and then vaporizes (due to an applied vacuum) at the bottom of the membrane. Usually, a dense membrane is used for this system, fabricated from exemplary materials such as polymers and their modified forms such as Chitosan, Polyvinyl alcohol (PVA), polydimethylsiloxane (PDMS). The membranes could be hydrophilic or hydrophobic in nature and can have organic or inorganic additives in it. FIG. 5 illustrates a system employing FO and RO, as well as a PV system.

Referring now to the schematic of FIG. 5, a storage tank 1 holds the influent water for the process, which is a moderate TDS fluid, in the range of 30,000 to 150,000 ppm. The influent water has liquid impurities such as methanol, ethanol, or other polar or nonpolar liquid species. The process water 3 is pumped by pump 2 to provide a brine stream to the input 4A' on the input side 4A' of FO membrane system 4'. The input 4D' to the output side of the FO membrane 4E' is a concentrated brine draw 18 containing a salt brine solution, optionally including zinc complex (or iron). The concentrated brine draw 18 is a high TDS fluid, in the range of 250,000 to 500.00 ppm. In this embodiment, the concentrated brine draw 18 may contain zinc complex but zinc complex is not required. If not using zinc, the concentrated brine draw 18 will include another salt brine such as sodium chloride, sodium bromide, potassium chloride, or magnesium chloride. The high brine draw fluid 18 draws pure water across the FO membrane, leaving a diluted brine draw 6, which did not pass through the FO membrane, and does not include pervaporation solvent. With pure water having been drawn out by the FO system, the process water leaving the FO system at 4B' is a concentrated fluid 5, with a TDS in the range of 300,000 to 500,000 ppm.

The concentrated process fluid 5 is waste from the process, to be hauled off-site or otherwise disposed of.

The diluted brine draw 6 from the FO output side at 4C' includes no pervaporation solvent, and is passed through pump 7, and combined with pervaporation solvent 21 at 7B to form diluted brine draw 8 containing pervaporation solvent. Examples of PV solvents are methanol and ethanol. Mineral salts that make up liquid brine solutions have lower solubility in these types of solvents. When the volume of the solvent exceeds the volume of water in the brine mixture, the minerals will start to become insoluble and form physical particle sizes that are adequate to filter with various filter membranes such as ultrafiltration or microfiltration. The solvents act as a filtering aid to improve the separation of minerals from the newly formed solution of brine/solvent. Solvent selection may be done based on examining the maximum concentration possibility in water and the minimum solubility of the solvent based on a certain temperature range and mineral salt used to form the brine. See also, "Solubility of NaCl, NaBr, and KCl in Water, Methanol, Ethanol, and Their Mixed Solvents," J. Chem. Eng. Data, Vol. 50, No. 1, pages 29-32. Ideally, a mineral salt is used that has a strong osmotic draw potential when suspended in water as a brine solution (high water solubility), and at the same time has a low solubility in a specific solvent.

The brine draw 8 is passed to static mixer 31 to mix the solvent with the diluted brine draw. In an exemplary embodiment, the static mixer has no moving parts, and is essentially a pipe fitting with an internal helix structure that mixes fluids together as the fluids flow through it. It uses the natural flow of the fluids flowing through it to create some turbulence as the fluids flow through the helix structure thus mixing the two fluids together. The mixed brine draw 8 with the solvent is passed to the input of solids membrane separation unit 9. The unit 9 includes an ultrafiltration membrane filter system configured to do the final separation of solids from liquids. The system 9 separates the solid waste material from the diluted brine draw 8, and one output is concentrated brine slurry 20 which is sent to slurry pervaporation membrane polisher 32B. A vacuum pump 26A applies a vacuum to the membrane polisher 32B to remove any pervaporation solvent vapor from the polisher 32B and sends the recovered vapor to cooling heat exchanger 24, and the recovered solvent is sent to pervaporation solvent storage 22. The remaining concentrated brine slurry 20 from the membrane polisher 32 is sent to brine storage tank 15, which includes a mixer.

The diluted brine output 9A of the system 9, with pervaporation solvent, is solids-free, and is fed to the input of the pervaporation membrane system 10. The PV membrane system 10 includes two portions separated by a dense membrane mounted on a sintered stainless steel porous support. The top portion 10A is an open chamber where the feed liquid mixture is recirculated and a bottom portion 10B is an open chamber where permeate (in vapor form) is condensed. The top and bottom portions are separated by a dense PV membrane 10C which may include hollow fiber membranes, composite membranes or asymmetrical membranes. Examples of PV membrane materials include polymers and their modified forms such as Chitosan, Polyvinyl alcohol (PVA), polydimethylsiloxane (PDMS).

The feed coming from system 9 is fed to the top portion 10A of the PV chamber. The selective liquid and/or impurities then permeate through the membrane. These permeated liquids are captured in vapor form by applying a vacuum using vacuum pump 26 at a port in the bottom portion of the PV system 10. The vapors 25 are condensed with a cooling system 24 and the recovered solvent is stored in the PV solvent storage system 22. The solvent 21 is pumped by pump 22A to 7B for mixing with the diluted brine draw 6 to form brine draw 8 with solvent, as described above.

The system 10 removes the liquid impurities from brine draw 8, and the resulting diluted brine 12, with no pervaporation solvent, is outputted from system 10 at 10B and pumped by pump 11 to high salinity reverse osmosis (RO) system 13. System 13 outputs purified permeate product water 19, recovering 50% to 80% of total water input to the system from the storage tank 1. Any salt brine (or iron or zinc) that is not filtered out by the ultrafiltration membrane system 9 and which is not filtered out with the solvent will get separated in the reverse osmosis system 13. The reject stream is concentrated brine draw 14, which is passed to the brine storage tank 15. A supplemental brine feed tank 30 is also connected to the tank 15 by brine feed line 27. A conductivity sensor 29 measures the conductivity of the brine in the tank 15. Conductivity controller 28 is responsive to the conductivity signal from sensor 29 to control pump 30A to pump supplemental brine into the tank 15 for mixing with the tank contents.

The brine in tank 15 is pumped by pump 16 to a cooling heat exchanger 17 and the concentrated brine 18 is fed to the input 4C' of the output side of the FO system 4'.

Although the foregoing has been a description and illustration of specific embodiments of the subject matter, various modifications and changes thereto can be made by persons skilled in the art without departing from the scope and spirit of the invention.

What is claimed is:

1. A high salinity water purification process for processing high salinity influent fluid containing liquid impurities to obtain purified water, comprising:
    passing a stream of the influent fluid in an input along a first side of a forward osmosis (FO) membrane and delivering an output stream from an output port, the influent fluid having moderate levels of total dissolved solids (TDS) in the range of 30,000 to 150,000 ppm;
    passing a stream of a concentrated salt brine draw from an input along a second side of the forward osmosis membrane, the concentrated brine having high levels of TDS in the range of 250,000 to 500,000 ppm;
    the concentrated brine drawing pure water through the FO membrane from the influent fluid, concentrating the level of TDS in the output stream and diluting the concentrated brine draw to produce a diluted brine draw;
    introducing a pervaporation (PV) solvent into the diluted brine draw to form a diluted brine draw containing the PV solvent;
    passing the diluted brine draw containing the PV solvent into a solids membrane separation system to remove any solids from the diluted brine draw containing PV solvent, and to provide a solids-free diluted brine draw with PV solvent output free of solids;
    passing the solids-free diluted brine draw with PV solvent to an input PV chamber of a PV membrane system comprising the input PV chamber and a PV membrane separating the input chamber from another PV chamber;
    applying a vacuum to the another PV chamber, drawing the PV solvent and liquid impurities through the PV membrane into the another PV chamber as a PV vapor, leaving the solids-free diluted brine draw in the input PV chamber;
    pumping the diluted brine draw with no PV solvent into a high salinity reverse osmosis (RO) or nanofiltration system to obtain purified water on the output of the RO or nanofiltration membrane and an RO stream of concentrated brine draw which did not pass through the membrane.

2. The process of claim 1, wherein said introducing a pervaporation (PV) solvent into the diluted brine draw to form a diluted brine draw containing the PV solvent comprises:
    mixing the PV solvent with the diluted brine draw with a static mixer.

3. The process of claim 1, further comprising:
    passing the PV vapor through a cooling heat exchanger to recover PV solvent in liquid form;
    storing the recovered PV solvent in liquid form in a PV solvent storage tank for reuse in the process.

4. The process of claim 1, wherein said passing the diluted brine draw containing the PV solvent into a solids membrane separation system further provides a concentrated brine slurry which is passed to a brine storage tank with a mixer, for reuse by the process.

5. The process of claim 4, further comprising:
    providing a supplemental brine feed tank containing supplemental brine feed;
    connecting the supplemental brine feed tank to the brine storage tank through a brine feed line and a brine chemical pump;
    measuring the conductivity of brine in the brine storage tank;
    controlling the brine chemical pump to pump supplemental brine to the brine storage tank in dependence on the measured conductivity.

6. The process of claim 4, wherein said passing a stream of a concentrated salt brine draw from an input along a second side of the forward osmosis membrane comprises:
    pumping concentrated brine from the brine storage tank to the input along the second side of the forward osmosis membrane.

7. The process of claim 6, wherein said pumping concentrated brine from the brine storage tank to the input along the second side of the forward osmosis membrane includes pumping the concentrated brine through a cooling heat exchanger.

8. The process of claim 1, wherein said passing the diluted brine draw containing the PV solvent into a solids membrane separation system further provides a concentrated brine slurry which is passed into a slurry PV membrane polisher system configured to remove PV solvent in the concentrated brine slurry as a PV vapor by application of a vacuum;
    passing the PV vapor through a cooling heat exchanger to recover PV solvent in liquid form;
    storing the recovered PV solvent in liquid form in a PV solvent storage tank for reuse in the process.

9. The process of claim 1, wherein the concentrated salt brine draw contains zinc or iron complex and another salt brine or acid.

10. The process of claim 1, wherein the PV solvent includes one of methanol and ethanol.

11. A system for purifying high salinity influent fluids, comprising:
    a forward osmosis (FO) system comprising an FO membrane, an influent side input port and an influent side output port arranged on in influent side of the FO membrane, and a FO output side input port and a FO output side output port arranged on an output side of the FO membrane;

a reverse osmosis (RO) or nanofiltration system;

the FO system configured to receive the influent fluid at the influent side input port and to pass concentrated fluid out the influent side output port;

the RO or nanofiltration system configured to receive input fluid at an input port and to pass concentrated fluid which did not pass through a membrane of the RO or nanofiltration system at an output port, and purified fluid which has passed through the membrane;

a recirculating brine flow path;

a concentrated brine draw pumped into the FO output side input port, the concentrated brine draw having a high level of total dissolved solids (TDS) than the TDS level in the influent fluid;

a pump for pumping the concentrated brine draw through the FO system from the FO output side input port to the FO output side output port;

the recirculating brine flow path passing from the FO output side output port to an input to the RO or nanofiltration system;

a pervaporation (PV) solvent introduced into the diluted brine draw from the FO system to form a diluted brine draw containing the PV solvent;

a solids membrane separation system configured to remove any solids from the diluted brine draw containing PV solvent, and to provide a solids-free diluted brine draw with PV solvent output and a concentrated brine slurry;

a PV membrane system comprising an input PV chamber and a PV membrane separating the input chamber from another PV chamber, and configured to receive the solids-free diluted brine draw with PV solvent in the input chamber;

a vacuum source configured to apply a vacuum to the another PV chamber to draw the PV solvent and liquid impurities through the PV membrane into the another PV chamber as a PV vapor, leaving the solids-free diluted brine draw with no PV solvent in the input PV chamber;

a pump for pumping the diluted brine draw with no PV solvent into the RO or nanofiltration system to obtain purified water on the output of the RO or nanofiltration membrane and an RO stream of concentrated brine draw which did not pass through the membrane.

12. The system of claim 11, wherein the concentrated brine draw contains zinc or iron complex and another salt brine or acid.

13. The system of claim 11, wherein the PV solvent includes one of methanol and ethanol.

14. The system of claim 11, further comprising:
a static mixer for mixing the PV solvent with the diluted brine draw.

15. The system of claim 11, further comprising:
a cooling heat exchanger configured to receive the PV vapor from the vacuum source to recover PV solvent in liquid form;
a PV solvent tank for storing the recovered PV solvent in liquid form for reuse by the system.

16. The system of claim 11, further comprising:
a brine storage tank with a mixer, configured to receive the concentrated brine slurry for reuse by the system.

17. The system of claim 16, further comprising:
a supplemental brine feed tank containing supplemental brine feed;
a brine feed pump;
a brine feed line connecting the supplemental brine feed tank to the brine storage tank through the brine chemical pump;
a conductivity sensor configured to measure the conductivity of brine in the brine storage tank;
a controller configured to control the brine chemical pump to pump supplemental brine to the brine storage tank in dependence on the measured conductivity.

18. The system of claim 16, further comprising:
a pump configured to pump concentrated brine from the brine storage tank to the input along the second side of the FO membrane.

19. The system of claim 18, further comprising:
a cooling heat exchanger connected in the recirculating brine flow path between the pump and the input along the second side of the FO membrane and configured to cool the concentrated brine.

20. The system of claim 11, further comprising:
a slurry PV membrane polisher system configured to remove PV solvent in the concentrated brine slurry as a PV vapor by application of a vacuum;
a cooling heat exchanger configured to recover PV solvent in liquid form;
a PV solvent storage tank for storing the recovered PV solvent in liquid form for reuse by the system.

* * * * *